UNITED STATES PATENT OFFICE.

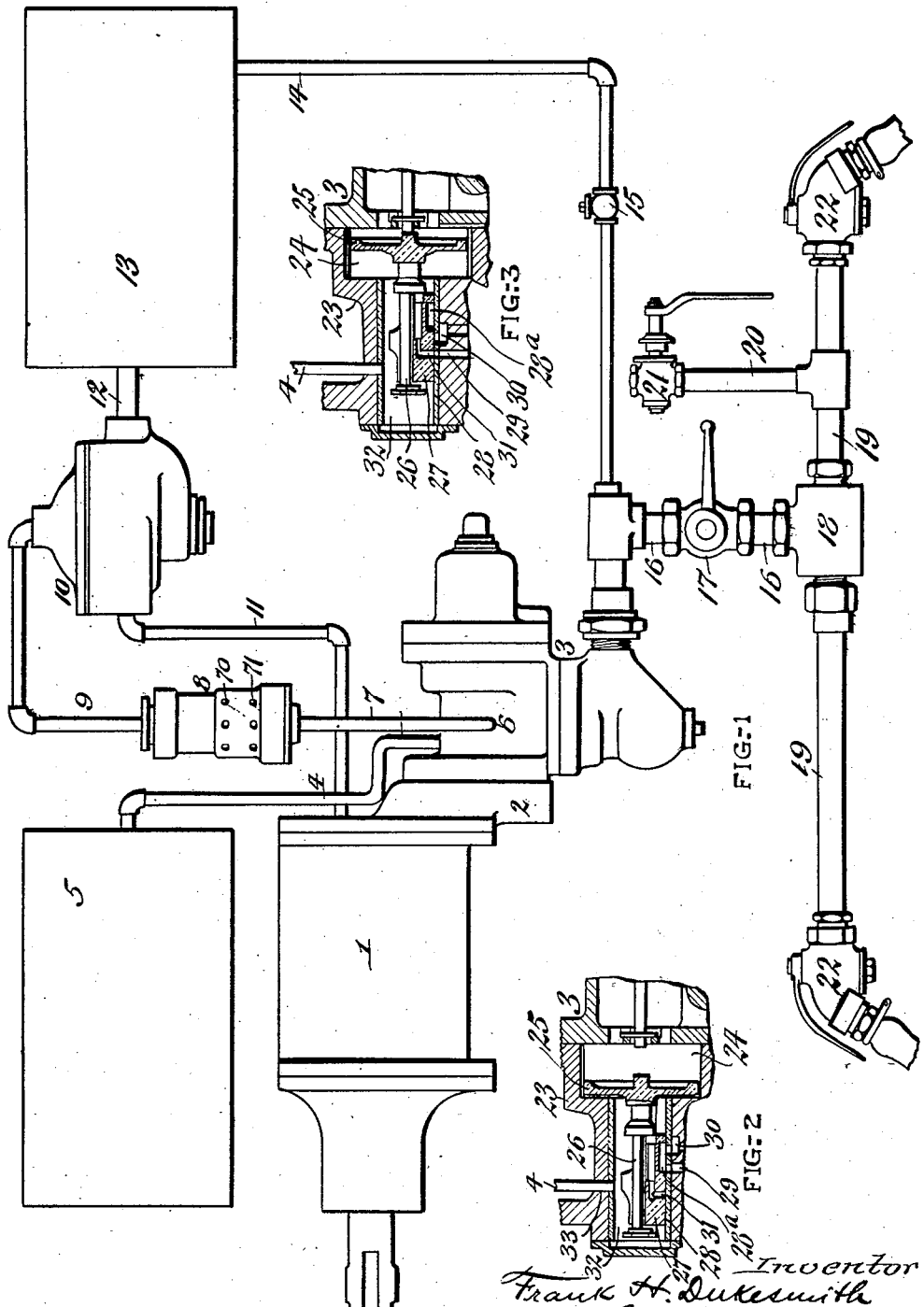

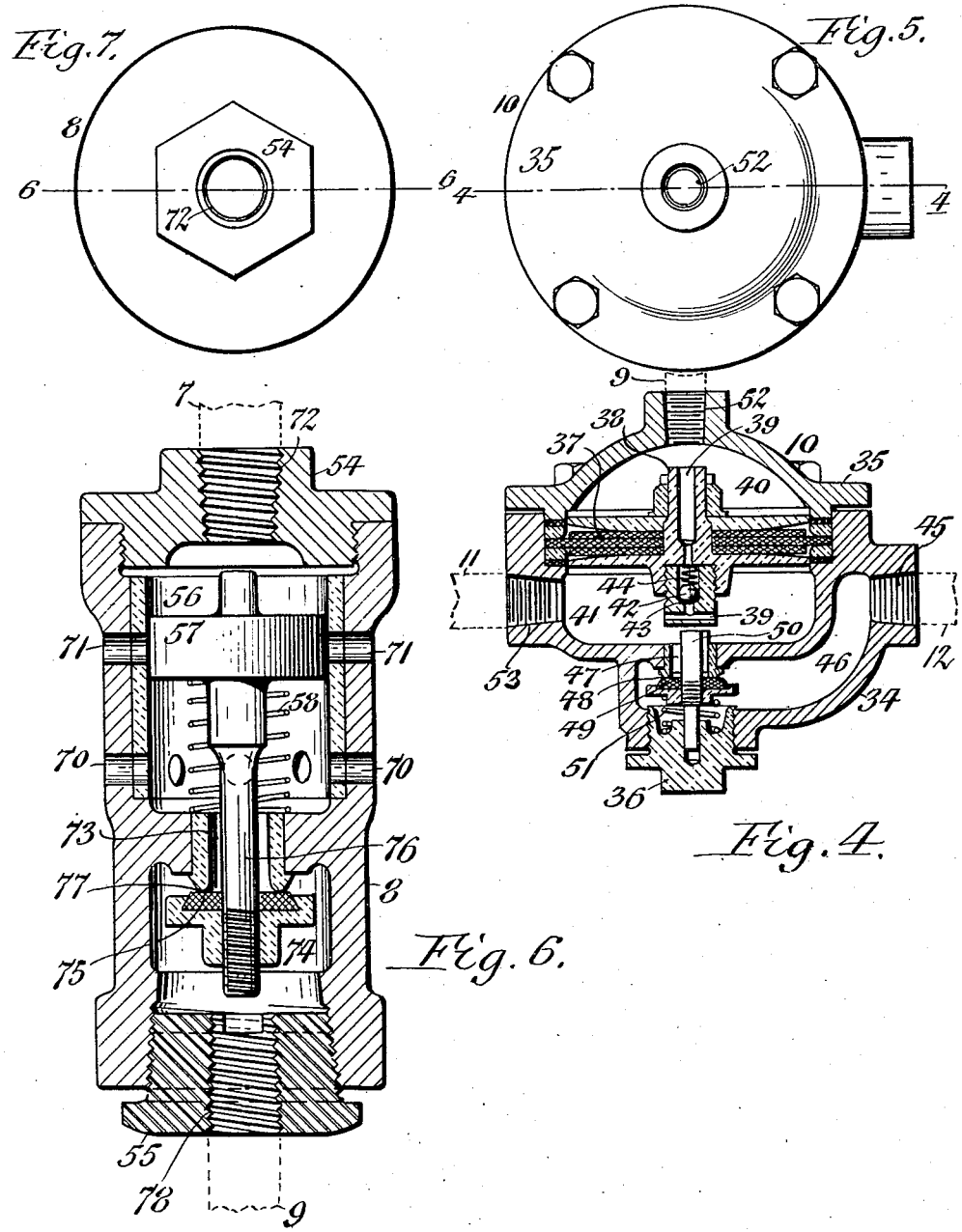

FRANK H. DUKESMITH, OF MEADVILLE, PENNSYLVANIA, ASSIGNOR TO THE RELIANCE AIR BRAKE COMPANY, INC., OF BUFFALO, NEW YORK, A CORPORATION OF NEW YORK.

AIR-BRAKE-CONTROL SYSTEM.

1,285,649.  Specification of Letters Patent.  Patented Nov. 26, 1918.

Application filed April 4, 1917. Serial No. 159,722.

*To all whom it may concern:*

Be it known that I, FRANK H. DUKESMITH, a citizen of the United States, residing at Meadville, in the county of Crawford and State of Pennsylvania, have invented new and useful Improvements in Air-Brake-Control Systems, of which the following is a specification.

This invention relates in general to fluid pressure brakes, and has for its main object to provide means whereby, after the brakes have been applied, the pressure in the brake cylinders on the cars in a train will be automatically maintained until the brakes have been released in the usual manner.

With present standard air brake equipments used on freight cars, and on most of the passenger cars, there is always more or less leakage of brake cylinder pressure during the time that the brakes are applied, due to worn, dry or poorly fitted packing leathers around the pistons in the brake cylinders, or leaky pipe connections, and by reason of this fact it is a common practice for locomotive engineers to re-charge the auxiliary reservoirs on the cars at frequent intervals when descending grades, in order to be able to re-apply the brakes after the brake cylinder pressure has been reduced on account of brake cylinder leakage. And this operation of re-charging the auxiliary reservoirs demands that the pistons in the triple valves on the cars must be forced back to release and charging position, which position of the triple valve opens the brake cylinder directly to the atmosphere, unless there is a retaining valve connected to the exhaust port of the triple valve and the retaining valve is closed.

Consequently, in order to permit the locomotive engineer to re-charge the auxiliary reservoirs on the cars without running the risk of letting the train get from under control, it is very often necessary for the train crews to go over the tops of the cars and close the retaining valves, and then when the train has reached the bottom of the grade, the trainmen are again required to go over the tops of the cars and open the retaining valves, in order to permit the brakes to be operated without hindrance when the train is not descending a grade.

This method of handling heavy trains down grades is not only dangerous to the enginemen and trainmen, but it frequently results in serious damage to rolling stock and merchandise, due to the surging of the cars which follows a reduction of brake cylinder pressure. Whereas, if the brakes on the cars were kept constantly applied until road conditions demanded that they should be released, it not only would add greatly to the safety of the men operating the train, but it would also enable railroad companies to handle trains with more profit and greater despatch than is now possible under existing conditions.

Aside from the fact that the average brake cylinder is subject to more or less leakage on account of dry or worn packing leathers, it is also true that the average retaining valve pipe, and also the retaining valve itself, is subject to more or less leakage, which means that when the triple valve is driven to its release and charging position, and brake cylinder pressure is thereby admitted into the pipe that connects the exhaust port of the triple valve with the retaining valve, there is then a double chance for the brake cylinder pressure to all leak out before the engineer has had time to recharge the auxiliary reservoirs and re-apply the brakes. With a leaky brake cylinder and a leaky retaining valve pipe, or leaky retaining valve, it will take but a very short while for the brake cylinder pressure to become completely lost.

While it is true that numerous devices have heretofore been invented for the purpose of supplying air to a brake cylinder in order to overcome leakages from the cylinder, it is, nevertheless, a fact that most of them are very complicated, easy to get out of order, costly to manufacture, and expensive to install, whereas, in the invention which is the subject of this application for Letters Patents, I have provided a mechanism which reduces to a minimum the number of operative parts needed to secure the desired result, and have arranged a maintaining valve mechanism in a manner which permits of its being employed in connection with any standard type of plain or quick action triple valve without having to make any changes whatever in the structure of the triple valve or in the operating valves used on the locomotive. Furthermore, the regulating portion of my valve mechanism is operated by the pressure it receives directly from the brake cylinder, or its pipe connections, and its action in supplying air to the brake cylinder is in no way dependent upon the action of the triple valve or other valve mechanism.

According to the present invention, I propose to provide a valve mechanism subject to the opposing pressures of the brake cylinder and the initial brake cylinder pressure confined in the regulating chamber of a maintaining valve mechanism hereinafter shown and described, and thereby provide against the danger caused by leakage of pressure from the brake cylinders and, furthermore, to avoid the necessity of having to employ the use of hand controlled retaining valves in the handling of trains down heavy grades.

In the accompanying drawings:

Figure 1 is a view of a car brake equipment with my improvements applied thereto. Figs. 2 and 3 are fragmentary sectional views of an ordinary triple valve in different positions which may be of any standard type. Fig. 4 is a sectional view of the regulating portion of my maintaining valve mechanism taken on line 4—4, of Fig. 5, and Fig. 6 is a sectional view of the release valve portion of my maintaining valve mechanism taken on line 6—6 of Fig. 7.

Similar characters of reference indicate corresponding parts throughout the several views.

In Fig. 1 of the drawings, the construction illustrated comprises a brake cylinder 1 connected by a conduit 2 to a triple valve 3 which latter is in turn connected by a pipe 4 to an auxiliary reservoir 5. From the exhaust outlet 6 of the triple valve 3, a pipe 7 extends to the release portion 8 of my maintaining valve mechanism and pipe 9 connects the release valve portion 8 with the regulating portion 10 of this maintaining valve mechanism. Pipe 11 connects the brake cylinder 1 with the regulating portion 10 of the maintaining valve mechanism and the regulating portion 10 is connected by pipe 12 to a supply reservoir 13 which latter is provided with a supply pipe 14 containing a check valve 15. This supply pipe 14 is connected with the branch pipe 16 of train-pipe 19 containing an ordinary cutout cock 17 and leading to an air strainer 18 to both ends of which are connected the sections 19 of the main brake or train pipe. A branch pipe 20 connects the main brake pipe 19 with the conductor's emergency valve 21. At opposite ends of main brake pipe 19 there are ordinary angle cocks 22.

As shown in Figs. 2 and 3, the ordinary triple valve comprises a valve casing 23 and a piston chamber 24; 25 is the triple valve piston which has a stem 26 on which is carried a slide valve 27 arranged to move on a seat 28. In this seat there is formed a service port 29 and an exhaust port 30, and in the slide valve 27 there is a supply port 31 and an exhaust groove 28ª. The slide valve is contained in a chamber 32, out of which there is an opening 33 to which is connected the auxiliary reservoir pipe 4.

As shown in Fig. 4, the regulating portion 10 of my maintaining valve mechanism comprises a lower casing section 34 and an upper casing section 35 which may be connected together in any suitable manner, a bottom plug 36, a diaphragm 37 arranged between the casing sections 34, 35 and provided with a stem 38 containing a passage 39. The diaphragm 37 separates the upper regulating chamber 40 from the lower variable pressure chamber 41 in this casing. In the passage 39 there is a check valve 42 arranged to engage with a seat 43 therein and in the passage 39 there is a spring 44 arranged to engage with the check valve 42 and hold the same yieldingly against said seat 43. In the lower casing section 34 there is a pipe opening 45 to receive pipe 12, as shown in Fig. 1, which communicates with a passage 46 having an outlet 47, the lower end of which forms a seat 48 arranged to be engaged by a supply valve 49 having a stem 50. On the underside of the supply valve 49 there is a spring 51, the lower end of which engages with the bottom plug 36 and operates to hold this valve yieldingly against its seat. The lower chamber 41 has a pipe opening 53 which connects with pipe 11, as shown in Fig. 1. The upper chamber 40 has a pipe opening 52 connecting with the pipe 9 leading from the regulating portion 10 to the release portion 8 of my maintaining valve mechanism, as shown in Fig. 1.

As shown in Fig. 6 the release portion 8 of my maintaining valve mechanism comprises a casing having in its upper end a plug 54 and in its lower end a plug 55. This casing has an upper release chamber 56 in which is arranged a piston 57 and a spring 58 below the piston 57, which tends to raise the lattter and the valve connected therewith. Leading from this chamber 56 to the atmosphere are exhaust ports 70 and 71 which are arranged in different parts lengthwise of this chamber. Leading from the top end of this chamber 56 is an outlet 72 connecting with the pipe 7, as shown in Figs. 1 and 6, and in the lower end of this chamber 56 there is an outlet 73 leading into the lower chamber 74—the bottom end of which is closed by the plug 55 and pipe 9. The plug 55 contains an opening 78 which communicates with the pipe 9, as shown in Figs. 1 and 6. In the lower chamber 74 there is a check valve 75 attached to the stem 76 of the piston 57. This check valve 75 is arranged to engage with a seat 77 which constitutes the lower end of passage 73 connecting the upper chamber 56 with the lower chamber 74. The chambers 40, 74 and the piping connecting the same produce in effect a single regulating chamber.

The operation of my maintaining valve mechanism is as follows:

When the brakes are applied in the usual automatic manner, brake cylinder pressure passes from the brake cylinder 1 through pipe 11 to this chamber 41 of the regulating portion 10 of my maintaining valve mechanism (Fig. 4) and then passes through passage 39 past the check valve 42 into portion 40 of the regulating chamber and through opening 52 into the pipe 9, and thence through opening 78 into portion 74 of the regulating chamber and against the check valve 75, as shown in Fig. 6, which is normally held against its seat 77 by the spring 58. When the triple valve 3 has moved to its lap or closed position and shut off the flow of pressure from the auxiliary reservoid 5 to the brake cylinder 1, then should the pressure in the latter leak out and thereby fall below the pressure that is confined in the regulating chamber section 40 of my maintaining valve mechanism, it would cause the pressure in chamber 41 of the regulating portion, Fig. 4, to be likewise reduced to whatever degree the pressure in the brake cylinder falls, and this would cause the pressure in the regulating chamber space 40 above the diaphragm 37 (Fig. 4) to force the diaphragm 37 down until the lower end of the stem 38 engages with the stem 50 of the supply valve 49 and thereby force the supply valve 49 from its seat 48, which permits the pressure from the supply reservoir 13 to pass through pipe 12 (Fig. 1) into passage 46 (Fig. 4) and through opening 47 into the chamber 41 and thence through opening 53 into pipe 11 directly into the brake cylinder 1 until the pressure in the brake cylinder is restored to a degree equal to the pressure that is confined in the regulating chamber 40 above the diaphragm 37, when the diaphragm will assume its normal position, as shown in Fig. 4, thereby permitting the supply valve 49 to resume its normal position and close the supply port 47 and stop any further passage of air into the brake cylinder. Should the brake cylinder pressure again leak out, the pressure thus lost will then be replenished in the brake cylinder by the operation of the regulating portion 10 of the maintaining valve mechanism in the manner just described.

By referring to Fig. 3, it will be seen that when the triple valve is moved to its service position, in response to a reduction of brake pipe pressure, piston 25 by its stem 26 drags the slide valve 27 forward, and in doing so causes the exhaust groove 28$^a$ to be moved forward on its seat 28, thereby cutting off the exhaust port 30 from the supply port 29, which action prevents any air from getting into the exhaust port 30 to which is connected the pipe 7 leading to the release chamber 56 of the maintaining valve mechanism.

When the triple valve piston 25, Fig. 2, is forced to release position by the re-charging of the brake pipe 19, as shown in Fig. 2, the exhaust groove 28$^a$ in the slide valve 27 of the triple valve 3 will connect the supply port 29 with the exhaust port 30 and thereby cause brake cylinder pressure to flow into pipe 7 and against the piston 57 in the release valve portion, Fig. 6, causing the piston 57 to drive valve 75 from its seat 77 and thereby permit the pressure from chamber 74 and from regulating chamber 40, Fig. 4, to exhaust to the atmosphere by way of opening 73 and openings 70, 70, through the casing 8 (Fig. 1) and thereby stop any further action on the part of the maintaining valve mechanism until the brakes are again applied in the usual manner. At the same time that the piston 57 drives the valve 75 from its seat 77, it also uncovers the exhaust ports 71 in the release valve portion 8, Figs. 1 and 6 and thereby creates a direct opening from the triple valve exhaust port 6 to the atmosphere. After the brake cylinder pressure has been fully exhausted, then the spring 58 moves the piston 57 to its normal position and thereby causes the valve 75 to resume its normal position and close the upper end of the chamber 74, as shown in Fig. 6.

The supplemental or supply reservoir 13 being connected to the brake pipe 19 when the cut-out cock 17 is open, receives its pressure directly from the brake pipe 19, and therefore it is always initially charged with fluid pressure equal to the pressure in the brake pipe prior to the time when the brakes are applied. But by reason of the check valve 15 being located in the pipe 14 and as this check valve 15 opens only in the direction of the supply reservoir 13, any variation of brake pipe pressure does not affect in any way the pressure that is in the supply reservoir 13 since that pressure is only affected by leakage from the brake cylinder, or by an increase of brake pipe pressure above the degree of pressure in the supply reservoir 13.

I claim as my invention:

1. In a fluid pressure brake, the combination with a triple valve and a brake cylinder, of a maintaining valve mechanism operating in response to a reduction of brake cylinder pressure for supplying air to the brake cylinder, said maintaining valve mechanism comprising a regulating portion and a release portion substantially as described, said regulating portion receiving air from said brake cylinder when the brake is applied.

2. In a fluid pressure brake, the combination with a triple valve and a brake cylinder, of a maintaining valve mechanism operating in response to a reduction of brake cylinder pressure for supplying air to the brake cylinder and in response to the application of brake cylinder pressure flowing through the exhaust port of the triple valve against a piston contained in the release portion of said maintaining valve mechanism for releasing the air from the brake cylinders and from the regulating portion of said maintaining valve mechanism.

3. A fluid pressure brake, comprising a brake cylinder, a triple valve having an exhaust port, an air supply reservoir, and a controlling mechanism operating in response to a reduction of brake cylinder pressure for supplying air to the brake cylinder from said supply reservoir, comprising a variable pressure chamber having an inlet port connected with said supply reservoir and an outlet port connected with said brake cylinder, a check valve controlling said inlet port of said pressure chamber, a regulating chamber, a diaphragm arranged between said variable pressure chamber and regulating chamber and provided with a stem adapted to engage said check valve and containing a port leading from said pressure chamber to said regulating chamber, a check valve arranged in the port of said stem and opening toward the regulating chamber, a release chamber connected by a passage with the exhaust port of the triple valve and having permanently open exhaust ports leading to the atmosphere and piston controlled exhaust ports also leading to the atmosphere and an intermediate port connecting the regulating chamber with the release chamber, a piston arranged in the release chamber and controlling said piston controlled exhaust ports, a valve controlling said intermediate port and connected with said piston, and means for yieldingly moving said piston in a direction for causing the same to close said piston controlled ports and cause the valve connected therewith to close said intermediate port.

4. In a fluid pressure brake, the combination with a triple valve, and a brake cylinder, of a maintaining valve mechanism operating in response to a reduction of brake cylinder pressure for supplying air to the brake cylinder, said maintaining valve mechanism comprising a regulating portion receiving air from said brake cylinder when the brake is applied, and a releasing portion which is operated by brake cylinder pressure exhausting by way of the triple valve exhaust port.

5. In a fluid pressure brake, the combination with a triple valve, and a brake cylinder, of a maintaining valve mechanism operating in response to a reduction of brake cylinder pressure for supplying air to the brake cylinder, said maintaining valve mechanism comprising a regulating portion which receives air from said brake cylinder when the brake is applied.

6. In a fluid pressure brake, the combination with a triple valve, and a brake cylinder, of a maintaining valve mechanism operating in response to a reduction of brake cylinder pressure for supplying air to the brake cylinder, said maintaining valve mechanism comprising a releasing portion which is operated by brake cylinder pressure exhausting by way of the triple valve exhaust port.

7. A fluid pressure brake comprising a brake cylinder, a triple valve having an exhaust port, an air supply reservoir, and a controlling mechanism operating in response to a reduction of brake cylinder pressure for supplying air to the brake cylinder from said supply reservoir, comprising a variable pressure chamber having an inlet port connected with said supply reservoir and an outlet port connected with said cylinder, a check valve controlling said inlet port of said pressure chamber, a regulating chamber, a diaphragm arranged between said variable pressure chamber and regulating chamber and provided with a stem adapted to engage said check valve and containing a port leading from said pressure chamber to said regulating chamber, and a check valve arranged in the port of said stem and opening toward the regulating chamber.

8. A fluid pressure brake comprising a brake cylinder, a triple valve having an exhaust port, an air supply reservoir, and a controlling mechanism operating in response to a reduction of brake cylinder pressure for supplying air to the brake cylinder from said supply reservoir comprising a release chamber connected by passage with the exhaust port of the triple valve and having a permanently open exhaust port leading to the atmosphere and a piston control port also leading to the atmosphere and an intermediate port, a piston arranged in the release chamber and controlling said piston controlled exhaust port, a valve controlling said intermediate port and connected with said piston, and means for yieldingly moving said piston in a direction for causing the same to close said piston controlled port and cause the valve connected therewith to close said intermediate port.

FRANK H. DUKESMITH.

Copies of this patent may be obtained for five cents each, by addressing the "Commissioner of Patents, Washington, D. C."